(12) United States Patent
Sommerfeld

(10) Patent No.: US 11,172,616 B2
(45) Date of Patent: Nov. 16, 2021

(54) SWATH AERATOR

(71) Applicant: Ryan Ray Sommerfeld, Medstead (CA)

(72) Inventor: Ryan Ray Sommerfeld, Medstead (CA)

( * ) Notice: Subject to any disclaimer, the term of this patent is extended or adjusted under 35 U.S.C. 154(b) by 73 days.

(21) Appl. No.: 16/506,460

(22) Filed: Jul. 9, 2019

(65) Prior Publication Data
US 2021/0007282 A1    Jan. 14, 2021

(51) Int. Cl.
| | |
|---|---|
| A01D 78/00 | (2006.01) |
| A01D 57/28 | (2006.01) |
| A01D 80/02 | (2006.01) |
| A01D 41/12 | (2006.01) |
| A01B 45/00 | (2006.01) |

(52) U.S. Cl.
CPC ............ *A01D 78/006* (2013.01); *A01B 45/00* (2013.01); *A01D 41/1243* (2013.01); *A01D 57/28* (2013.01); *A01D 78/005* (2013.01); *A01D 80/02* (2013.01)

(58) Field of Classification Search
CPC .... A01D 78/006; A01D 57/28; A01D 78/005; A01D 80/02; A01D 41/1243; A01B 45/00
See application file for complete search history.

(56) References Cited

U.S. PATENT DOCUMENTS

| | | | | |
|---|---|---|---|---|
| 2,432,653 A | * | 12/1947 | Bloom ................... | A01D 80/02 56/400 |
| 3,014,335 A | * | 12/1961 | Nolt ....................... | A01D 80/02 56/400 |
| 3,059,403 A | | 10/1962 | Vincent et al. | |
| 3,927,511 A | * | 12/1975 | Burris .................... | A01D 46/12 56/33 |
| 4,038,810 A | * | 8/1977 | Williams ............... | A01D 57/02 56/220 |
| 4,342,366 A | * | 8/1982 | Schenk .................. | A01B 23/02 172/198 |
| D273,792 S | * | 5/1984 | Ender, Sr. ............. | D15/27 |
| 4,524,575 A | * | 6/1985 | Nilsen ................... | A01D 84/00 56/372 |

(Continued)

FOREIGN PATENT DOCUMENTS

| | | | | |
|---|---|---|---|---|
| DE | 19530427 A1 | * | 2/1997 | ........... A01D 89/003 |
| EP | 2815639 | | 12/2014 | |

(Continued)

*Primary Examiner* — Arpad Fabian-Kovacs
(74) *Attorney, Agent, or Firm* — Adrian D. Battison; Ade & Company Inc.; Ryan W. Dupuis

(57) ABSTRACT

A swath lifter includes a rotor over which the crop is carried for aeration with the rotor driven in a direction so that an underside of the rotor adjacent the ground is driven opposite to the direction of movement. The rotor carries rows of tines at angularly spaced positions around the rotor each associated with a flexible strip of a resilient material located in front of the tines and covering an inner part of the tines with the outer part exposed so that, as the rotor rotates forwardly relative to the ground, the strip is presented to the swath on the ground in advance of the tines to avoid contact of the inner portion of the tines with the crop material at the top of the swath while the exposed outer ends of the tines operate on the wetter part of the swath at the ground.

17 Claims, 3 Drawing Sheets

(56) References Cited

U.S. PATENT DOCUMENTS

| | | | | |
|---|---|---|---|---|
| 4,589,497 | A * | 5/1986 | Kovar | A01B 23/02 172/643 |
| 5,027,907 | A * | 7/1991 | Delyea | A01B 19/02 172/707 |
| 5,450,717 | A * | 9/1995 | Delperdang | A01D 57/20 56/366 |
| 6,125,622 | A * | 10/2000 | Brackebusch | A01D 84/00 56/365 |
| 6,196,329 | B1 * | 3/2001 | Pierce | A01B 33/103 172/543 |
| 6,260,293 | B1 * | 7/2001 | Monroe | E01H 5/045 37/196 |
| 7,934,365 | B2 * | 5/2011 | Schumacher | A01D 80/02 56/400 |
| 2003/0155139 | A1 * | 8/2003 | Pfisterer | A01B 45/00 172/554 |
| 2011/0225942 | A1 * | 9/2011 | McClure | A01D 89/002 56/364 |
| 2013/0327009 | A1 * | 12/2013 | McClure | A01D 80/02 56/364 |
| 2016/0302360 | A1 | 10/2016 | Der Lely | |
| 2018/0249633 | A1 * | 9/2018 | Dietrich | A01D 41/147 |
| 2019/0343050 | A1 * | 11/2019 | Bishop | A01D 80/02 |

FOREIGN PATENT DOCUMENTS

| | | | | |
|---|---|---|---|---|
| EP | 3581017 A1 * | 12/2019 | | A01D 80/02 |
| FR | 1555190 A * | 1/1969 | | A01D 78/006 |
| WO | 2015091567 | 6/2015 | | |

\* cited by examiner

SWATH AERATOR

This invention relates to an apparatus for aerating a swath of crop material by lifting the swath from the ground and returning the lifted swath to the ground so as to open and aerate the crop material in the swath closest to the ground to assist in drying without damaging the dried material at the top of the crop.

BACKGROUND OF THE INVENTION

The purpose of harvesting crops into a swath is to enable the crop material to be dried before feeding to the combine harvester using a swath pickup. Swathing can be used for hay crops or for cereal crops and the arrangement herein can be used for any crops which are formed into a swath. It is known that the swath has a tendency to dry from the top down so that the material at the top can become overdried with a tendency to be damaged while material at or close to the ground remains to wet due to moisture at the ground or migrating downwardly. Machines are provided to lift and/or turn the swath to enable the swath to dry through. These have a tendency however to damage the crop by breakage or shelling and it is one object of the present invention to provide an arrangement of this type which can reduce or avoid damage to the crop while aerating the crop in the swath to assist drying.

SUMMARY OF THE INVENTION

According to the invention there is provided an apparatus for lifting a swath for aeration comprising:

a wheeled frame for movement over ground carrying a swath of harvested crop material;

a support rotor mounted on the frame for rotation around a longitudinal axis of the drum with the axis of the rotor arranged generally transversely across the swath;

a drive arrangement driving the drum in rotation in a direction so that an underside of the rotor adjacent the ground is driven opposite to the direction of movement of the ground relative to the drum as the rotor moves forwardly;

a plurality of rows of tines mounted on the rotor for rotation therewith, each row extending longitudinally of the rotor with the rows arranged at angularly spaced positions around the rotor with the tines extending generally outwardly from the rotor;

a plurality of flexible strips of a resilient material;

each strip being located in front of a respective one of the rows of tines so that, as the rotor rotates forwardly relative to the ground, the strip is presented to the swath on the ground in advance of the tines each strip extending along the row so as to cover a portion of each tine of the row;

each strip extending from the rotor to an outer edge of the strip spaced from the rotor and spaced inward of an outer end of the tines so that an outer portion of the tine is exposed beyond the outer edge of the strip and so that an inner portion of the tine is covered by the strip;

the tines and strip being arranged such that the outer ends of the tines pass close to the ground as the rotor rotates so as to pick up the crop material from the swath at a position immediately at the ground and so that the strip engages the crop material at the top of swath to avoid contact of the inner portion of the tines with the crop material at the top of the swath.

Preferably the rotor is shaped as a drum so that the lifted crop material in the swath is carried over the top of the drum and dropped onto the ground behind the drum.

Preferably the rotor has a length at least equal to a width of the swath so that the swath widens as it is carried over the top of the rotor and is carried over the top of the rotor without contact with confining elements which direct side edges of the crop inwardly. In this way the rotor acts to drive the crop up over the rotor and spread and fluff the crop up and as well as widening the swath.

Preferably the strip extends continuously along the row in that it has no spaces or openings since this best protects the dried crop and avoids pinching, but it may be formed in separate pieces arranged end to end or overlapping.

Preferably the strip has an inner edge attached to the rotor and is smooth and continuous to the outer edge. The strip is formed of a continuous band of material of the required width to extend to the outer edge from the drum. A rubber material which may have a fabric reinforcement material can be suitable.

Preferably the rotor comprises a drum which is preferably cylindrical but may be of other shapes such as polygonal and preferably has a diameter in the range 6 to 18 inches.

Preferably the tines of each row are double spring tines of the type typically used on a harrow and are carried on an elongate pipe mounted on the rotor parallel to the axis of the rotor with the pipes mounted at angularly spaced positions around the axis of the drum. Preferably each elongate pipe is rotatable about an axis longitudinal of the pipe so as to adjust an angle of the tines on the pipe to a radius of the rotor axis.

Preferably each elongate pipe is mounted on the rotor using flanges welded to the pipe and bolted to rotor mounted slides that allow for easy tine angle adjustment.

Preferably a length of the tines is in the range 5 to 8 inches and a width of the strip from the rotor to the outer edge is in the range 4 to 6 inches so that an amount of the tines exposed beyond the outer edge is in the range 4 to 5.5 inches and the tines are of a length and mounted on the rotor or drum so that the ends of the tines operate at a distance of 1 to 2 inches off the ground.

Preferably the rotor speed is relatively high and typically greater than 50 rpm and more preferably in the range between 60-100 rpm. This may be adjustable depending on crop and swath conditions or may be fixed on this range.

In most cases the rotor is mounted so that the axis of the rotor is at right angles to the direction of forward movement.

However in situations where the lifting of the crop is particularly difficult, the drum or rotor may be mounted or adjusted on the frame so that the axis of the rotor is at an angle a line at right angles to the direction of forward movement, where the angle is in the range 10 to 30 degrees and preferable of the order of 20 degrees.

The design is such that when the machine is pulled along a crop windrow or swath, the rotor including the soft belting and pickup teeth carried thereby are rotated around the axis of the rotor with a hydraulic speed greater than 50 rpm and more preferably adjustable between 60-100 rpm in a direction opposite to ground travel. This drives the crop up over the rotor and spreads and fluffs the crop up and as well as widening the swath. That is there are no confining elements which direct the edges of the crop inwardly and the rotor has a width at least equal to the swath. In this way the swath is lifted and opened to allow wind and sun to naturally dry the crop before harvesting.

The soft or resilient belting adjacent the rotor acts upon the driest crop and the top of the swath which is most prone to damage, while the pickup teeth projecting beyond the outer edge of the belting run down to 1-2 inches off the ground, picking up the down flat wet crop. This belting shielding and pickup teeth combination allows the aggressive part of the machine to pick up the hardest to lift and subsequently hardest to dry portion of windrow, while the belting shielding is gentle to the delicate partially or fully dry top portion of the swath.

The teeth or tines are formed in rows of double coil tine pickup teeth and are fixed to a pipe carried on the exterior of the rotor. The pipes are mounted at spaced positions around the rotor using flanges welded to the pipe bolted to rotor mounted slides that allow for easy tine angle adjustment. This key design feature of angle adjustable teeth being protected by the rubber belting shielding, makes the machine virtually impervious to wet crop wrapping on it thus solving or reducing a problem no other designer has successfully addressed. The machine also has a secondary hinge off the mounting base to the wheeled frame, that allows the machine to be pulled along a swath at an angle up to 20 degrees off of square, that is at up to 20 degrees from a line transverse to the direction of movement. This angle allows extremely flat windrows to be lifted.

The tines typically have a length from the pipe of the order of 6.5 inch long.

The machine also has a 9 ft wide by 24 inch throat that does not interfere with crop moving over the machine virtually eliminating plugging. Because of this combination of design features the apparatus can be used extensively in both having and cereal cropping operations, to assist with lifting widening and subsequently natural drying of windrows. Cereal grain crop and hay crop windrows treated by this machine typically need less grain drying and retain higher feed value qualities.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
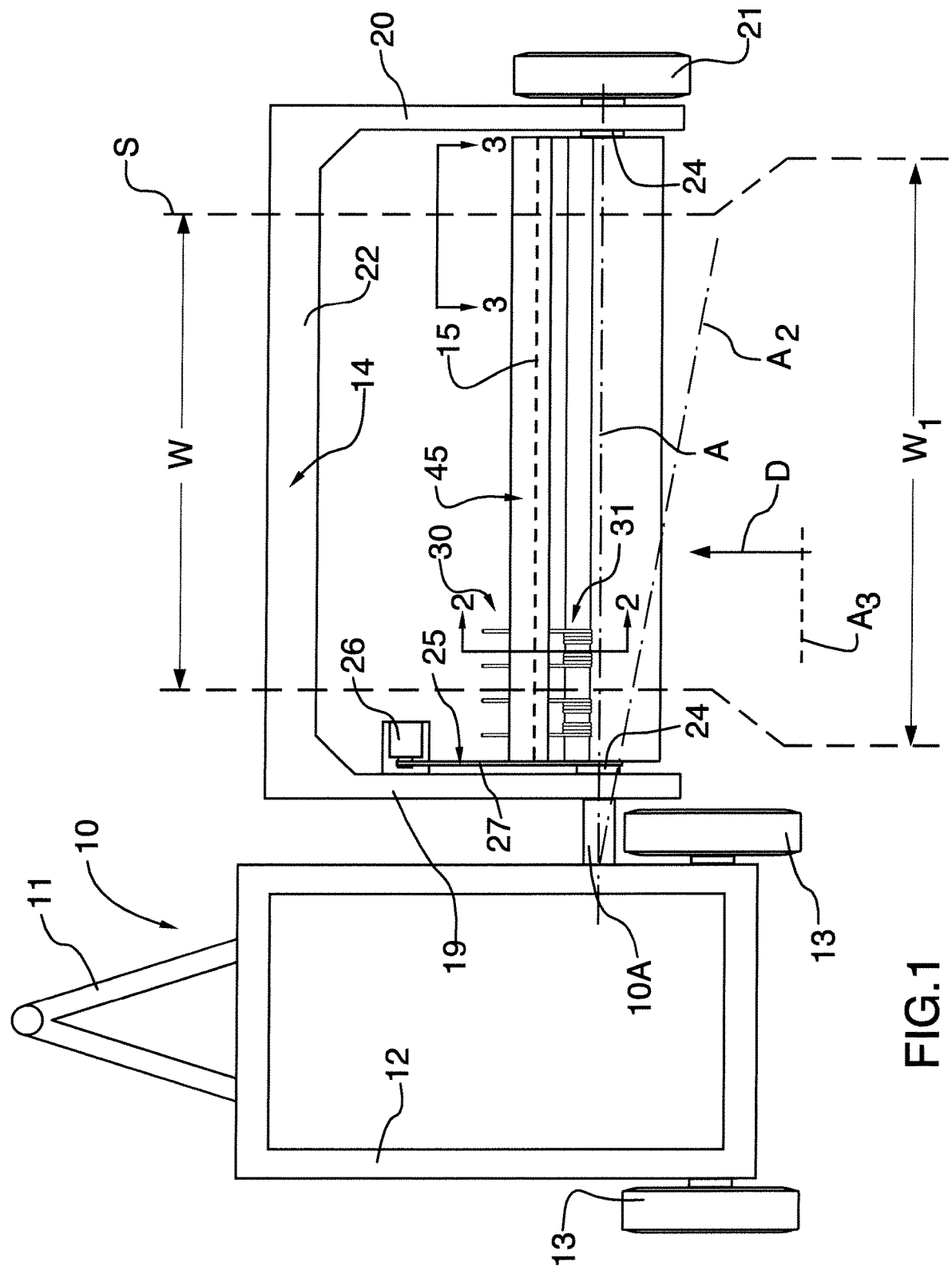
FIG. 1 is a top plan view of an apparatus according to the present invention.

The apparatus for lifting a swath for aeration includes a wheeled frame 10 including a hitch 11 pulling a subframe 12 mounted on ground wheels 13. The subframe carries a rotor frame 14 for movement over the ground. The rotor frame carries a cylindrical drum 15 with an end flange 16 and a peripheral wall 17. The drum is mounted on side arms 19 and 20 which are connected by a front beam 22 which holes the side arms fixed and parallel with the drum spanned therebetween on bearings 24. The arm 20 is carried on an outer wheel 21 and the arm 19 is attached to the side of the frame 10 by a mounting 10A to be carried thereby. The rotor frame is thus supported and pulled by the subframe so as to extend outwardly therefrom so that a tractor pulling the subframe runs along one side of a swath S with the rotor frame extending across the swath with the beam 22 in front of the rotor and above the swath so that the swath passes under the beam and can be lifted by the rotor acting as a pick-up as the rotor moves forwardly across the ground.

The rotor is thus mounted on the frame 14 for rotation around a longitudinal axis A of the rotor or drum 15 arranged generally transversely across the swath. A drive arrangement 25 including a motor 26 and a drive chain 27 acts for driving the drum in rotation. The drive chain can engage the rotor drum itself or the shaft on which the drum is mounted. The motor is suitably mounted on the frame 14 and is typically hydraulic so as to be drive by the hydraulic fluid from the tractor. The drum is driven in a direction so that an underside of the rotor adjacent the ground is driven forwardly or opposite to the direction of movement of the ground relative to the drum as the rotor moves forwardly. The rotor speed is greater than 50 rpm and more preferably in the range between 60-100 rpm. This causes the rotor to actively move against the crop and lift the crop so that it passes over the rotor.

The rotor or drum 15 carries a plurality of rows 30 of tines 31 mounted on the rotor 15 for rotation therewith. The tines are conventional harrow tines with a pair of tine fingers 32 and 33 connected by a helical spring 34 where an mid point of the spring is bolted at 35 onto the tine support 36. Thus each row 30 of the tines is mounted extending longitudinally of the rotor 15 with the rows 31 arranged at angularly spaced positions around the rotor 15 with the tines extending generally outwardly from the rotor 15.

Each tine row is carried on the support 36 in the form of an elongate cylindrical pipe 37 mounted on the rotor parallel to the axis of the rotor. The pipe has an outer surface 38 around which the helical spring 34 is wrapped. Each elongate pipe 37 is rotatable about an axis longitudinal of the pipe so as to adjust an angle of the tines on the pipe relative to a radius of the rotor axis A1. The elongate pipes are mounted on the rotor using flanges 39 welded to the pipe at one end and bolted to a bracket 40 for each pipe using bolts 41 mounted on slots in the bracket that allow for easy tine angle adjustment. Simple circular mounting brackets 44 are mounted at spaced positions along the pipe to hold the pipe axis A1 parallel to the drum axis A.

The rotor further carries a plurality of flexible strips 45 of a resilient material with each strip being located in front of a respective one of the rows of tines relative to the direction of rotation. Each strip extends from an inner end 46 bolted onto the outer face of the rotor by bolts 47 to an outer edge 48 of the strip spaced from the rotor surface 38 and spaced inward of an outer end 50 of the tines 32, 33. In this way an outer portion 51 of the tine 32, 33 is exposed beyond the outer edge 48 of the strip 45 and so that an inner portion 52 of the tine is covered by the strip.

Each strip extends fully along the length of the row so as to cover a portion of each tine of the respective row.

Figure 2:
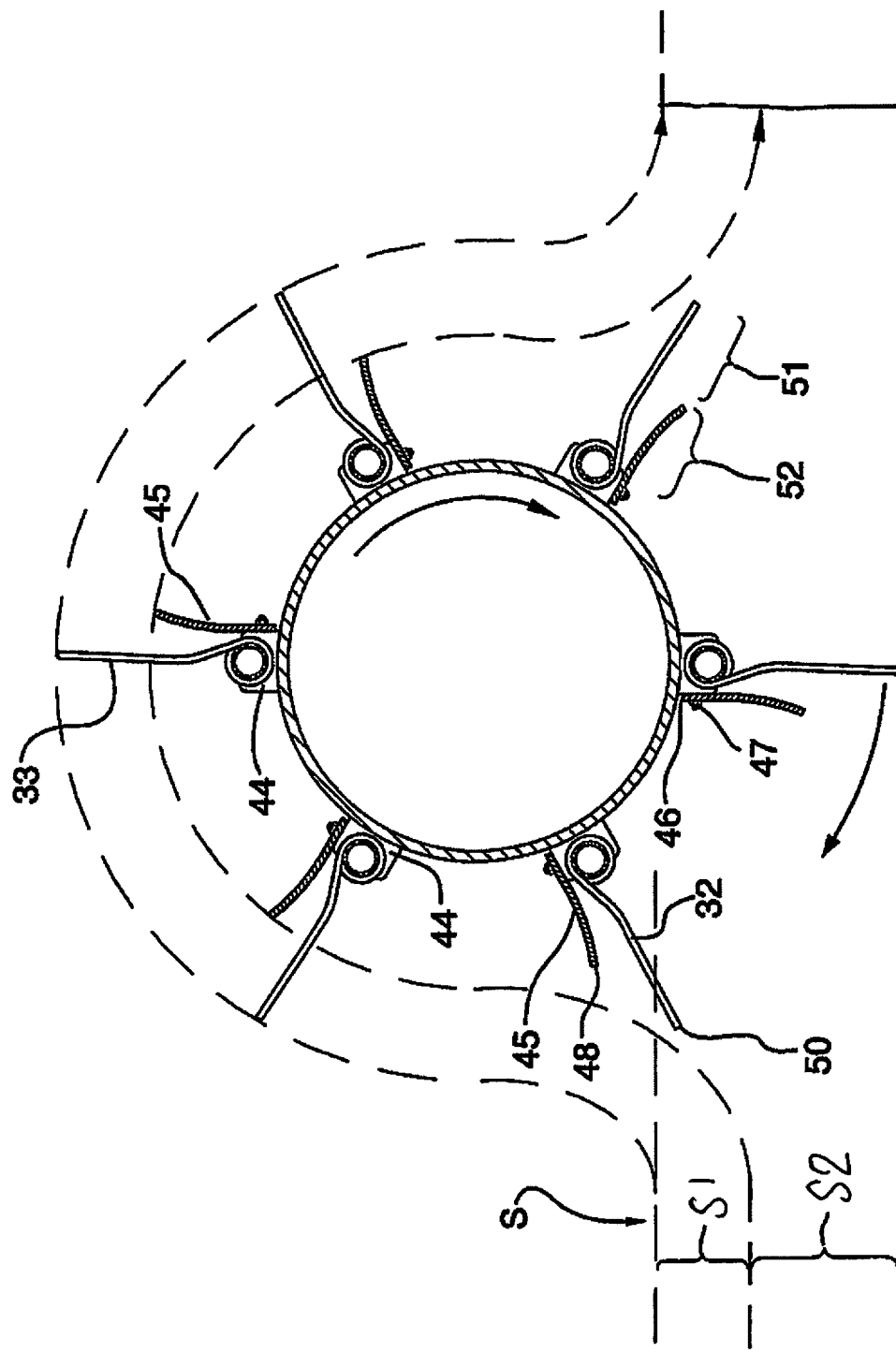
FIG. 2 is a view along the lines 2-2 of FIG. 1 showing the cross-section of the pick-up rotor.
Figure 3:
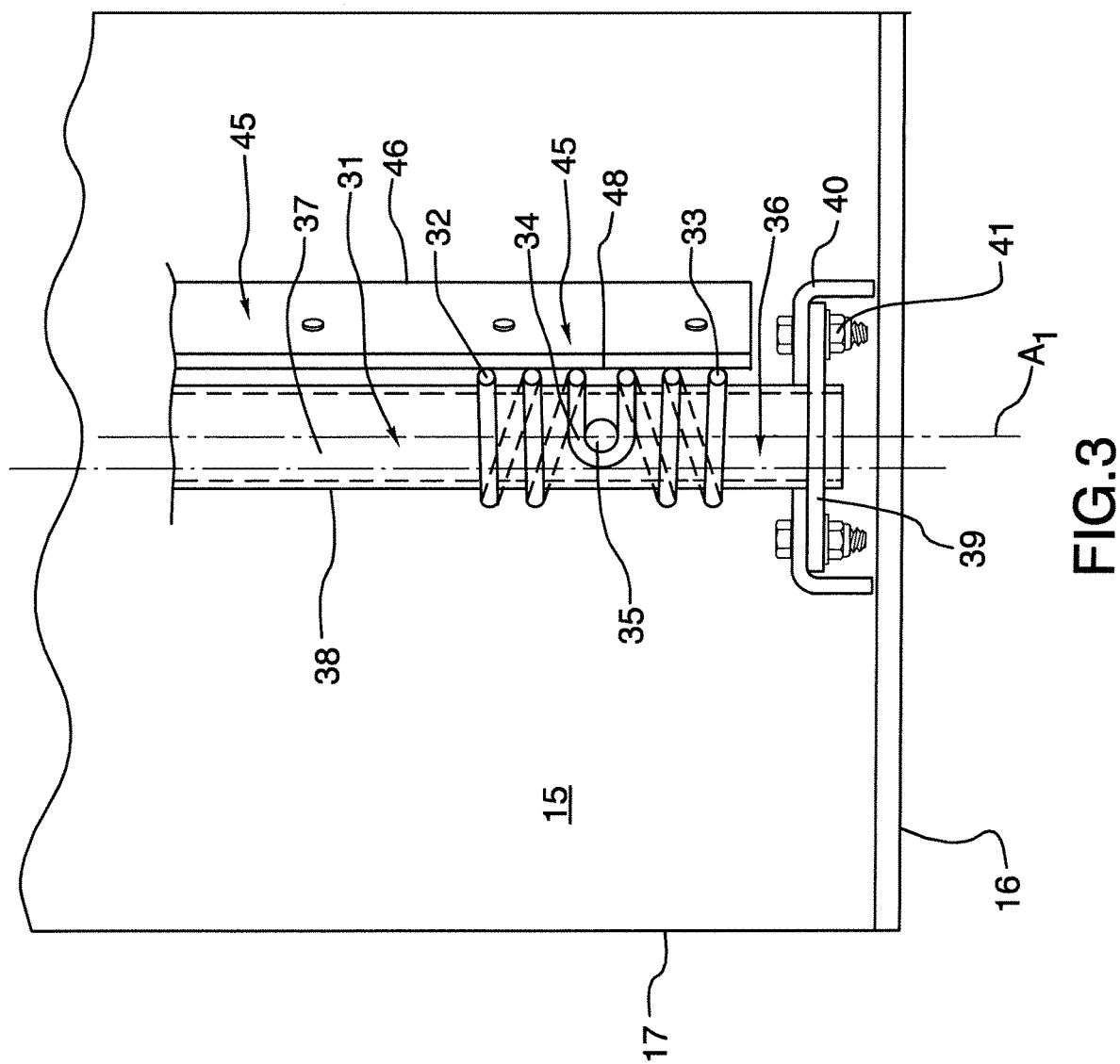
FIG. 3 is a view along the lines 3-3 of FIG. 1 showing a top plan view of one portion of the pick-up rotor sowing the mounting of the pipe and the tines thereon.

In this way so that, as the rotor rotates forwardly relative to the ground, the strip is presented to the swath on the ground in advance of the tines. The tines and strip are arranged such that the outer end portions 51 of the tines pass close to the ground, within 1 to 2 inches as the rotor rotates so as to pick up the crop material from the swath at a position immediately at the ground. The strip covers the inner portion 51 of the strip. As shown in FIG. 2, this causes the tines and the cooperating strip to operate so that the strip 45 engages the crop material at the top S1 of swath to avoid contact of the inner portion 52 of the tines 32, 33 with the crop material at the top portion S1 of the swath S. in this way, the rotor is arranged so that the lifted crop material in the swath is carried over the top of the rotor and dropped onto the ground behind the rotor.

The strip thus protects the swath material at the top of the swath which is already dried from damage from contacting the tines while the wet material in the portion S2 of the swath is vigorously engaged and lifted by the tines. The rotor is arranged so that the swath is carried over the top of the rotor without contact with confining elements which direct side edges of the crop inwardly. The rotor thus acts to drive the crop up over the rotor and spread and fluff the crop up and as well as widening the swath S from an initial width W to a wider width WI behind the rotor.

The length of the tines is in the range 5 to 8 inches and a width of the strip from the rotor to the outer edge is in the range 4 to 6 inches so that an amount of the tines exposed beyond the outer edge is in the range 4 to 5.5 inches. This length has been found to provide an effective lifting action from the exposed times while protecting the top part of the swath. These dimensions are of course crop dependent so that suitable tines and strips can be selected to meet the expected height of the swath in the field.

In FIG. 1, the mounting 10A is arranged so that the axis A of the rotor is at right angles to the direction D of forward movement. However the wheel 21 and the mounting 10A can be adjusted so that the axis A takes up a position A2 at an angle to a line A3 at right angles to the direction of forward movement, where the angle is in the range 10 to 30 degrees and preferable of the order of 20 degrees. In this way the tines move in planes at an angle to the forward direction so that there is a component of movement of the tines from their forwardmost engagement with the crop across the crop toward the end of the rotor at the frame 10. This transverse movement is known to provide an improved pick-up action in cases where the swath is sufficiently compacted to make the pick up difficult.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for lifting a swath comprising:
   a wheeled frame for movement over ground carrying a swath of harvested crop material;
   a support rotor mounted on the frame for rotation around a longitudinal axis of the support rotor with the longitudinal axis of the support rotor arranged generally transversely across the swath;
   a drive arrangement driving the support rotor in rotation in a direction of rotation in which an underside of the support rotor adjacent the ground is driven opposite to the direction of movement of the ground relative to the support rotor as the support rotor moves forwardly;
   a plurality of rows of tines;
   the support rotor having a plurality of elongate mounting members extending longitudinally of the support rotor and at angularly spaced positions around the support rotor;
   each elongate mounting member mounting a respective row of tines on the support rotor for rotation therewith;
   each row of tines extending longitudinally of the support rotor;
   the rows of tines being located at angularly spaced positions around the support rotor;
   the tines extending generally outwardly from the support rotor;
   a plurality of flexible strips of a resilient material;
   each flexible strip being located angularly in advance of a respective one of the rows of tines relative to said direction of rotation with the flexible strip thus being presented to the swath on the ground in advance of the tines of the respective row of tines;
   each flexible strip extending longitudinally along the respective row of tines so as to cover a portion of each tine of the respective row of tines;
   each flexible strip extending from the support rotor to an outer edge of the flexible strip spaced from the support rotor and spaced inward of an outer end of the tines of the respective row of tines with an outer portion of each of the tines of the respective row of tines being exposed beyond the outer edge of the flexible strip and with an inner portion of each of the tines of the respective row of tines being covered by the strip.

2. The apparatus according to claim 1 wherein the direction of rotation of the support rotor carries the lifted crop material in the swath over the top of the rotor with the crop material being dropped onto the ground behind the support rotor.

3. The apparatus according to claim 2 wherein the support rotor has a length at least equal to a width of the swath.

4. The apparatus according to claim 1 wherein the the swath is carried over the top of the support rotor without contact with confining elements which direct side edges of the crop inwardly.

5. The apparatus according to claim 1 wherein flexible the strip extends continuously along the respective row of tines.

6. The apparatus according to claim 1 wherein the flexible strip has an inner edge attached to the support rotor.

7. The apparatus according to claim 1 wherein the rotor comprises a cylindrical drum.

8. The apparatus according to claim 1 wherein each of said elongate mounting members comprises an elongate pipe mounted on the rotor parallel to the axis of the rotor.

9. The apparatus according to claim 8 wherein each elongate pipe is rotatable about an axis longitudinal of the pipe so as to adjust an angle of the tines on the pipe relative to a radius of the longitudinal axis of the rotor.

10. The apparatus according to claim 8 wherein each elongate pipe is mounted on the support rotor using flanges welded to the pipe and bolted to the support rotor.

11. The apparatus according to claim 1 wherein a length of the tines is in the range 5 to 8 inches and a width of the respective strip from the support rotor to the outer edge is in the range 4 to 6 inches with an amount of the tines exposed beyond the outer edge is in the range 4 to 5.5 inches.

12. The apparatus according to claim 11 wherein the outer ends of the tines operate at a distance of 1 to 2 inches off the ground.

13. The apparatus according to claim 1 wherein a rate of rotation of the support rotor is greater than 50 rpm.

14. The apparatus according to claim 1 wherein the tines are double spring tines.

15. The apparatus according to claim 1 wherein the support rotor has a diameter in the range 12 to 18 inches.

16. The apparatus according to claim 1 wherein the longitudinal axis of the support rotor is at right angles to a direction of forward movement.

17. The apparatus according to claim 1 wherein the longitudinal axis of the rotor is at an angle to a line at right angles to a direction of forward movement, where the angle is in the range 10 to 30 degrees.

* * * * *